US007631206B2

(12) United States Patent
Rothman et al.

(10) Patent No.: US 7,631,206 B2
(45) Date of Patent: Dec. 8, 2009

(54) METHOD AND APPARATUS TO SUPPORT ENHANCED ENERGY EFFICIENCY IN A PROCESSING SYSTEM

(75) Inventors: Michael A. Rothman, Sammamish, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 634 days.

(21) Appl. No.: 11/351,762

(22) Filed: Feb. 10, 2006

(65) Prior Publication Data

US 2007/0192642 A1    Aug. 16, 2007

(51) Int. Cl.
   *G06F 1/32* (2006.01)
(52) U.S. Cl. ..................................... 713/320
(58) Field of Classification Search ................... 713/320
   See application file for complete search history.

(56) References Cited

U.S. PATENT DOCUMENTS 3,601,645 A * 8/1971 Whitehead ................. 310/249
4,241,271 A * 12/1980 Johnson et al. ............. 310/219
6,279,046 B1 * 8/2001 Armstrong et al. ............. 710/5
6,700,292 B2 * 3/2004 Otani et al. ................. 310/248
2002/0144025 A1 * 10/2002 Poisner et al. ................. 710/15
2006/0281630 A1 * 12/2006 Bailey et al. ................. 502/200
2007/0005919 A1 * 1/2007 van Riel ...................... 711/163

OTHER PUBLICATIONS

ACPI specification, Revision 3.0a, Dec. 30, 2005 (available from http://www.acpi.info/spec.htm).

* cited by examiner

*Primary Examiner*—Thomas Lee
*Assistant Examiner*—Mohammed H Rehman
(74) *Attorney, Agent, or Firm*—D'Ann Naylor Rifai

(57) ABSTRACT

A first partition of a processing system may use polling to communicate with a device. In addition, the first partition may provide an interface that allows a second partition of the processing system to communicate with the device without requiring the second partition to use polling. For example, the first partition may present the device to the second partition as an interrupt-driven device. In one embodiment, the first partition creates an interface that presents a universal serial bus (USB) peripheral device to the second partition as a legacy peripheral device. The second partition my therefore use the device without conducting polling, and may consume less energy than a partition that conducts polling. Other embodiments are described and claimed.

19 Claims, 4 Drawing Sheets

METHOD AND APPARATUS TO SUPPORT ENHANCED ENERGY EFFICIENCY IN A PROCESSING SYSTEM

FIELD OF THE INVENTION

The present disclosure relates generally to the field of data processing, and more particularly to methods and related apparatus to support enhanced energy efficiency in processing systems.

BACKGROUND

The Advanced Configuration and Power Interface (ACPI) Specification describes techniques for managing power consumption in processing systems. For example, according to the ACPI Specification, computers may alternate between working and sleeping states. (Revision 3.0a of the ACPI Specification, dated Dec. 30, 2005, is currently available from www.acpi.info/spec.htm.)

In particular, the ACPI Specification describes "global system states" such as G0, G1, and G2, as well as the "sleeping states" S0, S1, S2, S3, S4, and S5. Global system state G2 and sleeping state S5 coincide, with either term being used to indicate the "system soft off" state. By contrast, global system state G0 is considered the "global working state" or "system working state." That state may also be referred to as sleeping state S0. The other sleeping states (i.e., S1-S4) correspond to the "global sleeping state" G1. Power consumption can be reduced by transitioning a processing system from a higher power state, such as G0, to a lower power state, such as G1, in appropriate circumstances.

In addition, the ACPI Specification describes the "processor power states" C0, C1, C2, and C3 as "processor power consumption and thermal management states within the global working state, G0." Power consumption may be reduced by transitioning the processor from a numerically lower processor power state, such as C0, to a numerically higher processor power state, such as C1. The ACPI specification also contemplates up to sixteen "processor performance states," referred to as P0, P1, etc. These processor performance states "(Px states) are power consumption and capability states within the active/executing" C0 state.

For instance, the ACPI Specification states that, in the working state, "the computer is used to do work, [although] processors can be in low-power (Cx) states if they are not being used . . . . The net effect of this is that the entire machine is functional in the Working state. Various Working sub-states differ in speed of computation, power used, heat produced, and noise produced. Tuning within the Working state is largely about trade-offs among speed, power, heat, and noise."

Accordingly, in a conventional processing system with a single central processing unit (CPU) with a single processing core, the operating system (OS) may dynamically change the operating characteristics of the CPU to reduce the amount of power consumed by the processing system. For instance, when the processing system is idle or does not need the maximum performance from the processor, the OS may transition the CPU from a higher power state to a lower power state (e.g., from C0 to C1) without transitioning the system out of the global working state G0. Or, within the processor power state P0, the OS may transition the CPU from a higher processor performance state to a lower processor performance state (e.g., from P0 to P1).

Effective power management provides many benefits. In mobile devices such as laptop computers, handheld computers, personal digital assistants (PDAs), cellular telephones (cell phones), entertainment devices, etc., one notable benefit is increased battery life. For purposes of this disclosure, the term "battery life" refers to the amount of time that a processing system can operate on battery power before the battery must be recharged or replaced.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
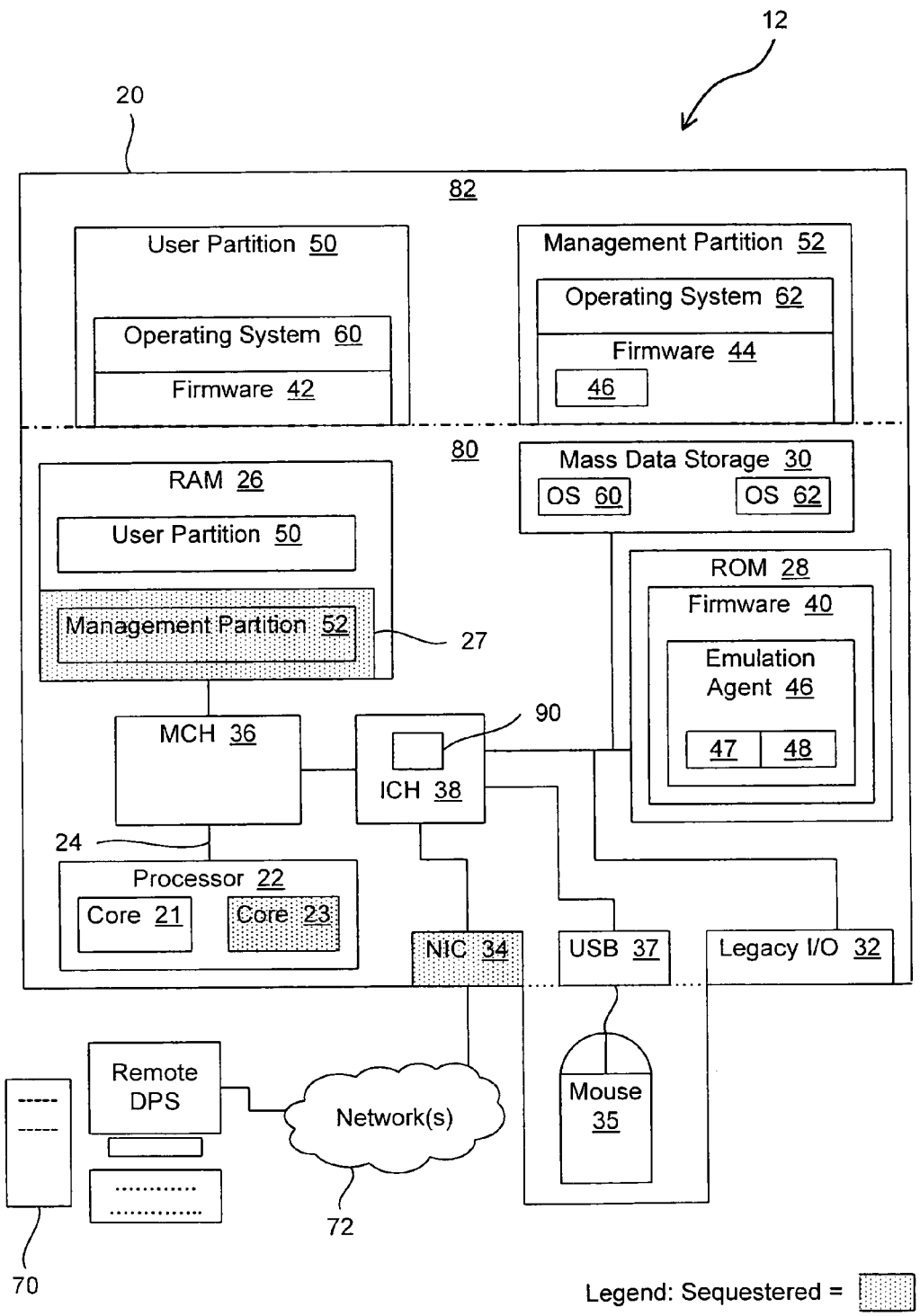
FIG. 1 is a block diagram depicting a suitable data processing environment in which certain aspects of an example embodiment of the present invention may be implemented.

When a conventional processing system is in the global working state but the system is idle, the OS may sometimes reduce the power consumption of the system by modifying the power state or performance state of the processor. However, if a processing system that would otherwise be idle is coupled to a device via a communications channel that uses polling, the OS may be required to keep the processor in a high power or performance state, to accommodate the necessary polling. Alternatively, the OS may be able to temporarily transition the processor to a lower power of performance state, but may need to frequently return the processor to a higher power or performance state, to accommodate the necessary polling. Thus, the energy efficiency of a processing system may be adversely affected by polling activity to support peripheral devices.

For instance, if a pointing device such as a mouse is connected to a processing system via a Universal Serial Bus (USB) connection, the OS will be required to frequently poll the mouse. For example, the processor may need to be in the P0 performance state to service polling requests, to ensure that a given USB target does not have any pending I/O transactions or hot-plug events that need to be monitored. (Version 2.0 of the USB Specification, dated Apr. 27, 2000, is currently available from http://www.usb.org/developers/docs). Other interfaces that require polling may also require activity on the part of the CPU merely to support peripheral devices which may be attached to the processing system via such interfaces, including interfaces that use wired or wireless communication channels.

The present invention pertains to means for improving the CPU power management, even when posed with situations that are largely intolerant of low power CPU operations, such as the situation described above. This disclosure provides a detailed description of one or more example embodiments of the present invention. However, the invention is not to be limited to the specific embodiment(s) described, but may be implemented in wide range of different processing systems and processing environments.

For purposes of this disclosure, depending upon the particular implementation under consideration, the term "processing unit" may denote an individual CPU within a processing system, a processing core within a CPU, a logical processing unit such as a hyper-thread (HT), or any similar processing resource, or any collection of such resources configured to operate collectively as a unit. As described in greater detail below, in an example embodiment, a processing system includes two or more processing units. A conventional OS and conventional applications may execute on a first processing unit, and a polling agent may execute on a second processing unit. The polling agent may handle polling to support a connection with a USB device, and the polling agent may provide an interface that behaves as a legacy interface between the conventional OS and the USB device, such that the USB device appears to the conventional OS as a legacy device, rather than a USB device.

For purposes of this disclosure, the term "legacy device" refers to a device that communicates with other components of a processing system without using polling. For instance, legacy mice include serial mice and personal system 2 (PS/2) mice. Similarly, terms like "legacy interface" and "legacy port" refer to components and/or constructs that provide for communications between peripheral devices and other components of a processing system without polling. For instance, legacy ports and interfaces may include, without limitation, serial ports, PS/2 ports, parallel ports, drivers for serial or parallel printers, drivers for serial or PS/2 peripheral devices, etc.

When an OS does not need to perform polling, the OS may transition its processing unit to a lower power or performance state, and may keep its processing unit in the lower power state longer than would be possible if the OS needed to perform polling. For purposes of this disclosure, terms like "processor power state," "processor performance state," "sleeping state," etc. are not limited to the definitions provided by the ACPI Specification, but also cover any analogous power states.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, a processor or CPU 22, communicatively coupled to various other components via one or more system buses 24 or other communication pathways or mediums. In the example embodiment, CPU 22 includes multiple processing units, such as a first processing core 21 and a second processing core 23. Alternatively, a processing system may include multiple CPUs, each having at least one processing unit.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, PDAs, telephones, handheld devices, entertainment devices such as audio and/or video devices, and other devices for processing or transmitting information.

Processing system 20 may be controlled, at least in part, by input from conventional input devices, such as a keyboard, a pointing device such as a mouse, etc. In particular, in the example embodiment, a USB mouse 35 is connected to processing system 20 via a USB port 37. However, in alternative embodiments, other types of devices may be connected to a processing system using interfaces that require polling. For instance, devices that may be supported include, without limitation, other types of USB pointing devices, USB keyboards, USB game controllers, and USB printers, as well as non-USB devices which require polling.

Processing system 20 may also respond to directives or other types of information received from other processing systems or other input sources or signals. Processing system 20 may utilize one or more connections to one or more remote data processing systems 70, for example through a network interface controller (NIC) 34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc.

Within processing system 20, processor 22 may be communicatively coupled to (a) one or more volatile or non-volatile data storage devices, such as RAM 26 and read-only memory (ROM) 28, (b) mass storage devices 30 such as integrated drive electronics (IDE) or small computer system interface (SCSI) hard drives, and/or (c) other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, SCSI controllers, network controllers, universal serial bus (USB) controllers, I/O ports 32, input devices such as a keyboard, a mouse, a camera, etc. Processing system 20 may also include one or more bridges or hubs, such as a memory controller hub (MCH) 36, an I/O controller hub (ICH) 38, a peripheral component interconnect (PCI) root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as on-board or embedded controllers, using components such as programmable or non-programmable logic devices or arrays, application-specific integrated circuits (ASICs), embedded computers, smart cards, and the like.

In the example embodiment, processing system 20 includes two or more partitions, such as a user partition 50 and a management partition 52, and processing system 20 prevents the OS and the other software in user partition 50 from accessing resources dedicated to management partition 52. In some embodiments, processing system 20 may also prevent management partition 52 from accessing resources dedicated to user partition 50. In the example embodiment, user partition 50 and management partition 52 may run different OSs (e.g., OSs 60 and 62, respectively).

Any suitable technique may be used to implement the partitioning. For example, user partition 50 may be implemented as a guest virtual machine, and management partition 52 may be implemented as a virtual machine monitor (VMM)

or as a host partition operating on top of a VMM, as described in greater detail below with respect to FIG. 2.

Alternatively, processing system 20 may use firmware-based partitioning, such that, when processing system 20 is started or powered on, the firmware creates user partition 50 as a main partition, and creates management partition 52 as a sequestered partition. The main partition may also be referred to as a legacy partition or a non-sequestered partition. During boot, the firmware may designate or recognize processing unit 23 as a bootstrap processor (BSP) and processing unit 21 as an application processor (AP). The firmware may then use the BSP and/or the AP to instantiate the partitions on the platform. For instance, the firmware may use the BSP to set platform configuration constructs to disable or hide particular components or devices within processing system 20 from OS 60 in main partition 50. As indicated by the dotted fill in FIG. 1, the components that are hidden from OS 60 may include NIC 34 and processing unit 23. The configuration constructs for hiding those components may include device hide registers 90 in ICH 38. As indicated by the dotted fill in FIG. 1, the firmware may also use ACPI parameters to hide one or more sequestered memory areas 27 in RAM 26 from OS 60. Additional details about device hide registers and related topics may be obtained from the Intel® I/O Controller Hub 6 (ICH6) Family Datasheet, dated January 2004 (the "ICH6 datasheet"). The ICH6 datasheet is currently available at http://www.intel.com/design/chipsets/datashts/301473.htm.

As described in greater detail below with respect to FIG. 4, an one embodiment, main partition 50 includes the basic input/put system (BIOS) code (e.g., firmware 42) running on BSP 23, and sequestered partition 52 includes the BIOS code (e.g., firmware 44) running on AP 21. One or more example embodiments of processing systems with firmware-based partitioning are described in greater detail in U.S. patent application Ser. Nos. 11/273,817 and 11/294,839, both of which are assigned to Intel Corporation. In alternative embodiments, other techniques may be used to create the partitions.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage. For purposes of this disclosure, the term "program" is used in general to cover a broad range of software constructs, including applications, routines, methods, modules, drivers, subprograms, processes, and other types of software components. For instance, data storage device 30, ROM 28, and/or RAM 26 may include various sets of instructions which, when executed, perform various operations. Such sets of instructions may be referred to in general as software.

In the example embodiment, firmware 44 includes an emulation agent 46 for communicating with USB devices and presenting legacy interfaces to those devices to user partition 50. In one embodiment, emulation agent 46 includes different modules for performing different aspects of the emulation service. For instance, emulation agent 46 may include a USB polling module 47 to handle communications with USB peripherals, and a legacy conversion module 48 to handle communications with user partitions. In one embodiment, a single emulation agent includes logic to handle emulation of many different kinds of USB devices. In other embodiments, multiple emulation agents may be used, with each agent servicing a different type of USB device or class of USB devices. When processing system 20 boots, processing system 20 may load emulation agent 46 into management partition 52, for instance as part of firmware 44.

Figure 2:
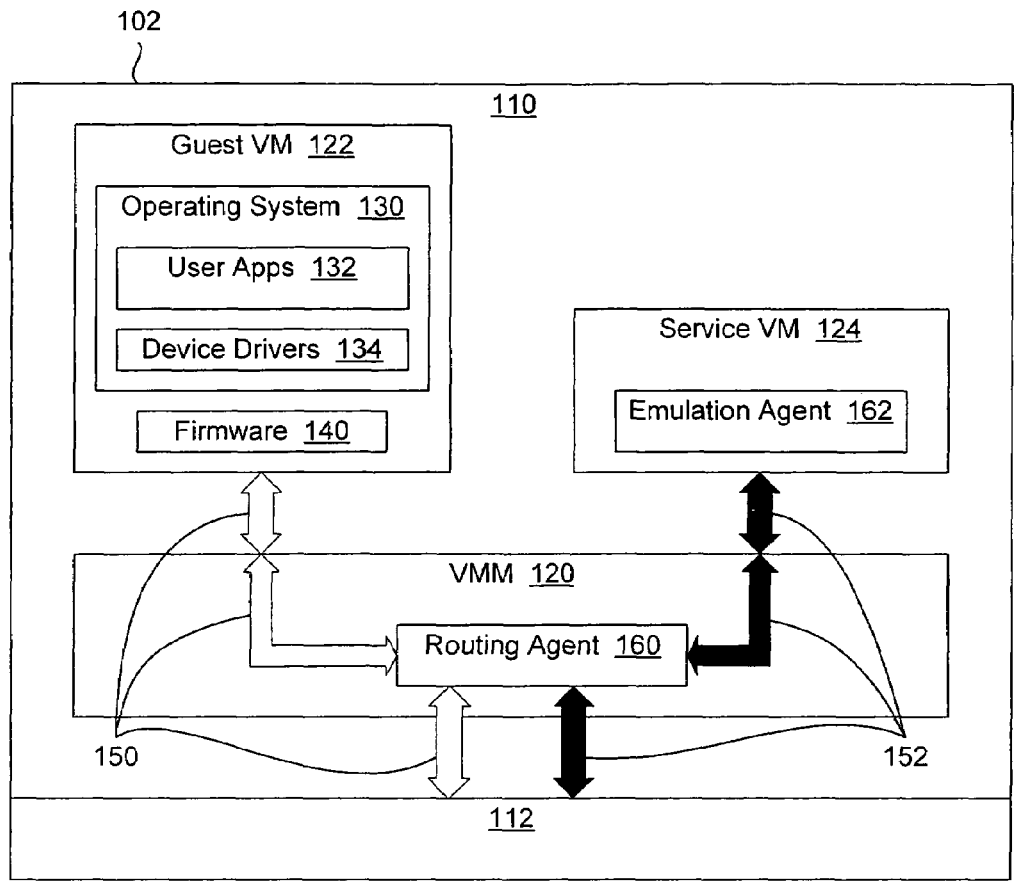
FIG. 2 is a block diagram highlighting example components for supporting enhanced energy efficiency in a processing system with a virtual machine monitor.

FIG. 2 is a block diagram highlighting example components for supporting enhanced energy efficiency in a processing system with a virtual machine monitor 120. In particular, FIG. 2 illustrates a processing system 102 with hardware components 112 and software components 110. Hardware components 112 may be the same as the components in processing system 20, or they may be different. The software components 110 executing on processing system 102 include a VMM 120 which supports at least one guest virtual machine (VM) 122. In the embodiment shown in FIG. 2, VMM 120 supports guest VM 122 and a service VM 124. Guest VM 122 may include an OS 130 that supports various user applications 132. OS 130 may also include various device drivers 134. In the embodiment shown in FIG. 2, device drivers 134 within guest VM 122 are all conventional device drivers. Guest VM 122 may also include firmware 140.

As indicated by arrows 150, VMM 120 may intermediate communications between guest VM 122 and hardware components 112. In particular, VMM 120 may include a routing agent 160 that monitors communications from guest VM 122 and filters out communications destined for virtual devices, directing some or all of those communications to service VM 124, as indicated by arrows 152. The I/O traps referenced below may cause an emulation agent 162 to receive communications from routing agent 160.

Service VM 124 may interact with the physical devices which correspond to the virtual devices in a manner that allows guest VM 122 to treat polled devices as legacy devices. For instance, emulation agent 162 may convert communications between protocols, so that VMM 120 can provide legacy virtual devices for guest VM 122, while the corresponding physical devices actually use a different protocol, such as USB. Emulation agent 162 may perform the same or similar functions as emulation agent 46 from FIG. 1. In alternative embodiments, the components may have any other suitable location or locations. For instance, the emulation agent may reside in the VMM, and/or the polling agent may reside within the emulation agent.

In the embodiment of FIG. 2, routing agent 160 and emulation agent 162 both execute on a different processing unit from guest VM 122. For instance, routing agent 160 and emulation agent 162 may execute on processing unit 32, while guest VM 122 executes on processing unit 21. The overhead associated with polling is thus isolated to a single processing unit.

Figure 3:
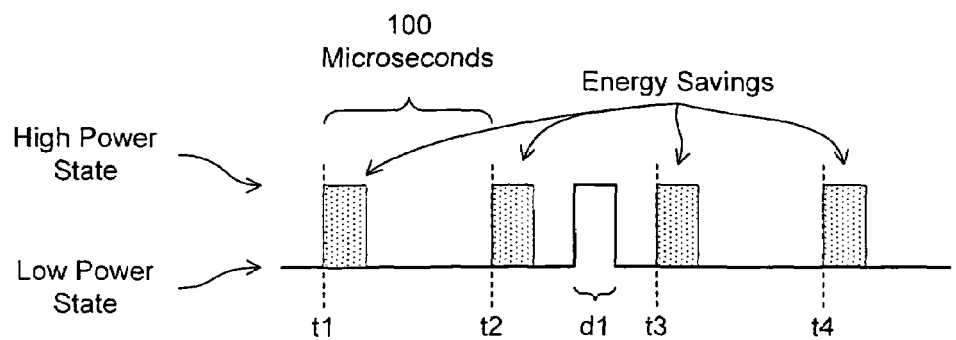
FIG. 3 is a timeline illustrating improvements in an example power consumption profile.

FIG. 3 is a timeline illustrating improvements in an example power consumption profile. In particular, the illustrated timeline illustrates a hypothetical power curve for processing unit 21 supporting user partition 50 in processing system 20. The horizontal lines at the level of the "low power state" illustrate that user partition 50 may set processing unit 21 to a reduced power or performance state when user partition 50 is idle or does not need the maximum performance from processing unit 21. The horizontal line at the level of the "high power state" illustrates that user partition 50 may set processing unit 21 to an increased or maximum power or performance state when necessary for user partition 50 to handle an interrupt received via a legacy device driver. In the low power state, processing unit 21 may consume approximately 4 watts of power. In the high power state, processing unit 21 may consume approximately 31 watts. In a sleep state, processing unit 21 may consume approximately 1 watt.

Specifically, FIG. 3 illustrates that user partition 50 may remain at the low power state from time t1 to at least time t4, except for a brief increase for duration d1 to handle an interrupt associated with communications with (what appears to user partition 50 as) a legacy peripheral device. However, in the example embodiment, that device is actually USB mouse 35. As described in greater detail below, emulation agent 46 within management partition 52 presents an interface between USB mouse 35 and user partition 50 that allows user partition 50 to treat USB mouse 35 as a legacy mouse. If not for emulation agent 46, user partition 50 would need to treat USB mouse 35 as a USB device. Consequently, user partition 50 would need to periodically poll USB mouse 35. Times t1-t4 in FIG. 3 correspond to a hypothetical polling interval of 100 microseconds. The dot-filled boxes starting at times t1, t2, t3, and t4 illustrate that, if not for emulation agent 46, user partition 50 would frequently need to transition processing unit 21 to a higher or maximum power or performance level, simply to perform polling. Accordingly, those boxes represent the energy savings made possible by emulation agent 46, since emulation agent 46 makes it possible for user partition 50 to do no polling, and to only service interrupt-driven events necessitated by demand, instead of events driven by a scheduled polling timeframe.

Figure 4:
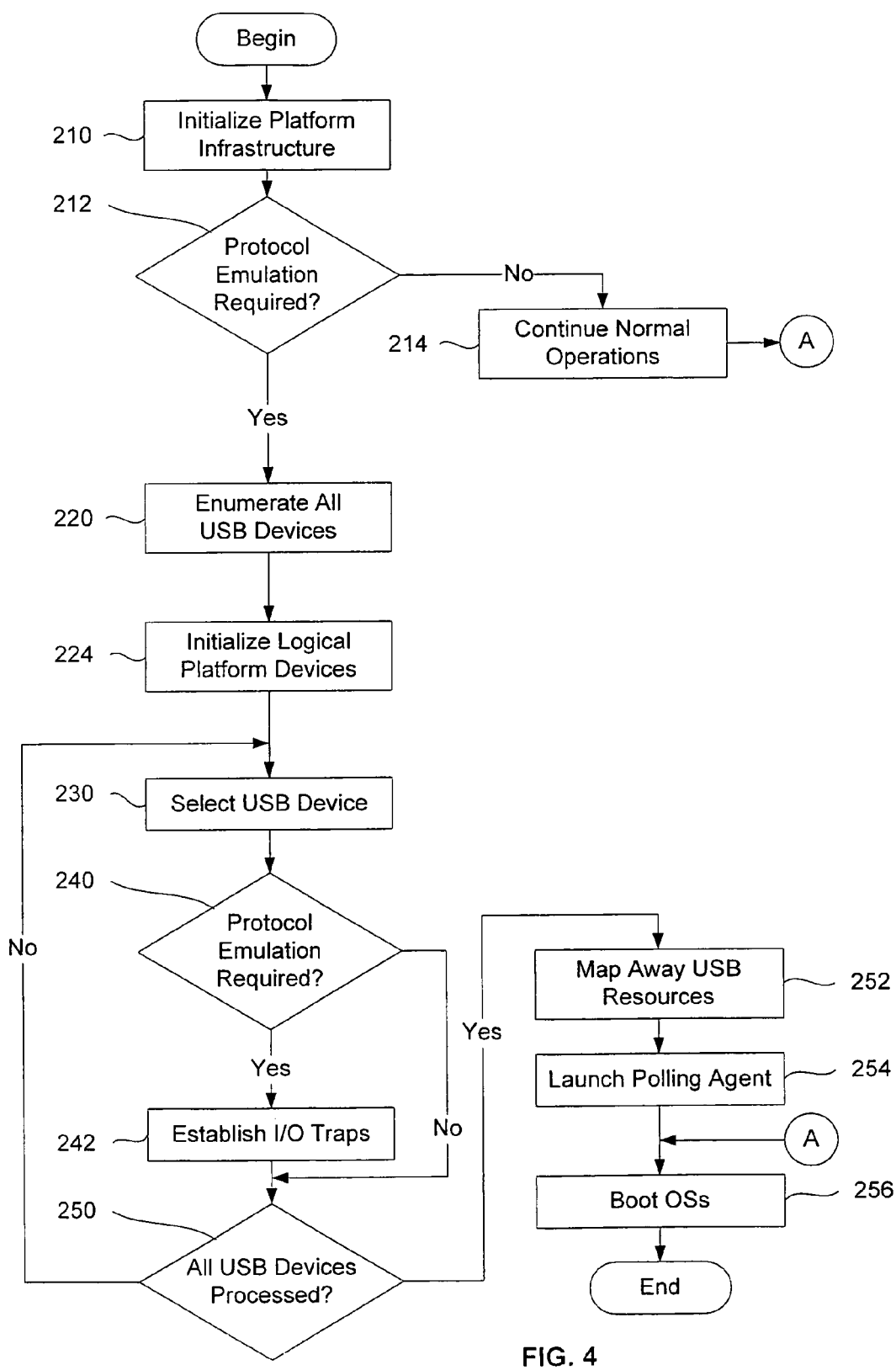
FIGS. 4 and 5 are flowcharts depicting various aspects of a process for supporting enhanced energy efficiency, according to an example embodiment of the present invention.
Figure 5:
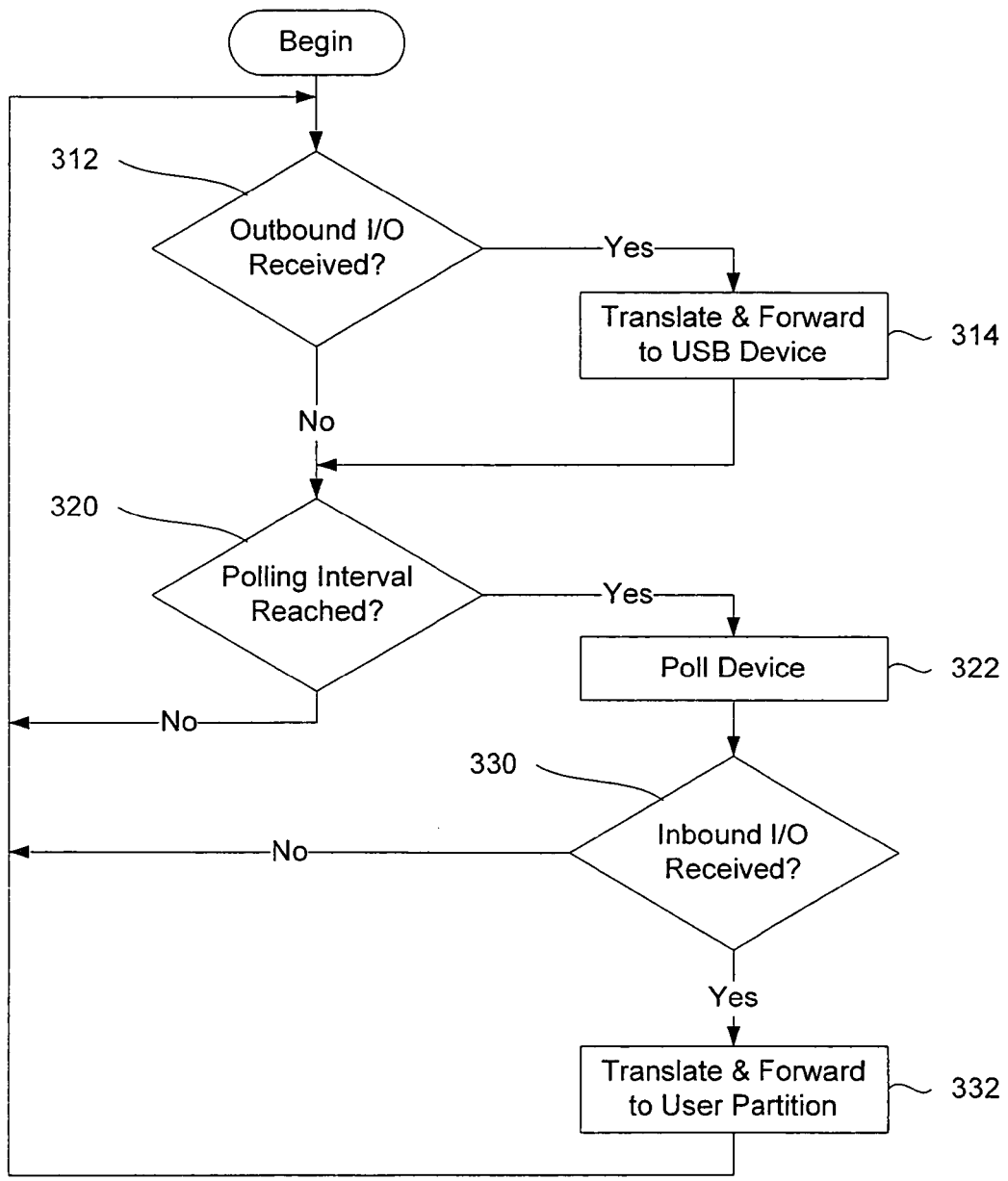

FIGS. 4 and 5 are flowcharts depicting various aspects of a process for supporting enhanced energy efficiency, according to an example embodiment of the present invention. The process illustrated in FIG. 4 may begin with processing system being powered up or started. At block 210 the firmware may initialize the platform infrastructure of processing system 20. For instance, the firmware may recognize a BSP and an AP, and may configure platform components to establish user partition 50 and management partition 52, as indicated above. Infrastructure initialization may also include the discovery and testing of hardware components such as processing units 21 and 23, MCH 36, RAM 26, ICH 38, etc., as well as the loading of firmware images into each partition. For instance, the image for firmware 42 may be mapped to the memory address space for partition 50, and the image for firmware 44 may be mapped to the memory address space for partition 52, so that the proper image for each partition is launched and executed from what is perceived to be the normal reset vector location. In reality, the image may be physically located elsewhere. In some platforms, a copy of the firmware for the boot step partition can be mapped in an arbitrary read-only memory region that will allow for execution by the chipset and/or VMM. Images 42 and 44 may be identical or may be different, depending on the particular implementation. For instance, a management partition or service VM may have an entirely separate firmware image from the user partition or guest VM, the firmware image for the management partition may be a subset of the image for the user partition, etc.

In FIG. 3, as indicated at block 212, firmware 44 determines whether management partition 52 is to provide device protocol emulation services to allow user partition 50 to use polling-based devices as legacy devices. This determination may be made based on predetermined platform configuration parameters saved in processing system 20, for example. If management partition 52 is not to provide device protocol emulation services, processing system 20 may finish the boot process using a more or less conventional approach, as indicated at block 214.

However, if emulation services are to be provided, firmware 44 may enumerate all of the USB devices connected to processing system 20 before booting any partitions to an OS, as indicated at block 222. Also, as indicated at 224, firmware 44 may initialize any logical devices required by platform policy, and connect them with physical devices in processing system 20. For example, the logical devices required by platform policy may include a console-in device (ConIn), a console-out device (ConOut), a standard error message destination device (StdErr), etc.

Firmware 44 may then begin stepping through a list discovered USB devices to determine which require emulation. For instance, firmware 44 may select one of the discovered USB devices at block 230, and may determine whether protocol emulation will be required for that device at block 240. For instance, firmware 44 may determine that protocol emulation will be required if predetermined configuration settings in processing system 20 indicate that the selected device is to be made available to user partition 50. If emulation is required, firmware 44 may establish I/O traps to represent platform-based attention to legacy ports, to enable routing of communications from user partition 50 to a destination polled device.

For instance, route logic or route configuration setting may be stored in firmware 44, and firmware 44 may use that stored data to establish the I/O traps. For example, firmware 44 may set bits within hardware such as ICH 38 and/or other chipset component in processing system 20, based on the route configuration settings. These hardware settings may cause ICH 38 and/or other chipset component in processing system 20 to generate signals such as traps, faults, or interrupts when particular I/O ranges are used. As described in greater detail below, emulation agent 46 may respond to such traps by intercepting communications to certain non-polled ports in the system (e.g., printer port, serial port, etc), and by converting these communications to equivalent communications to polled devices. For instance, emulation agent 46 may intercept communications from user partition 50 addressed to a parallel printer port, may convert those communications to the USB format, and may use a device host controller (e.g. USB Host Controller) to forward the converted communications to a USB printer. In addition, emulation agent 46 may reside on a single processing unit, so that the incessant polling required to support polled devices is limited to that single entity in the platform.

After establishing the I/O traps, if any, needed to support protocol emulation for the selected USB device, firmware 44 may determine whether all USB devices have been processed, as shown at block 250. If any USB devices have not been processed yet, the process may return to block 230, with the next device being selected and processed as described above.

The I/O traps referenced above, together with related components (e.g., the logic in firmware 44 for handling the I/O that is trapped), constitute one or more emulated legacy ports that user partition 50 may use to communicate with USB devices as if those devices were legacy devices. Such emulated legacy ports may also be referred to as virtual legacy ports. In addition, the terms "emulated legacy device" or "virtual legacy device" may be used to refer to the hardware and software components that appear to user partition 50 as a legacy device.

As indicated at block 252, once all USB devices have been processed, firmware 44 may map away all USB resources from the view of user partition 50. Consequently, the only way for user partition 50 to communicate with USB devices will be via an emulated legacy interface. Also, as indicated at block 254, firmware 44 may launch emulation agent 46. Example operations of emulation agent 46 are described in greater detail below with regard to FIG. 5. In the example embodiment, emulation agent 46 operates exclusively on processing unit 23. If additional emulation or polling agents are required, those agents may also be assigned to processing unit 21. In processing systems with multiple cores or processing units, assigning all polling agents to a single processing unit may optimize energy efficiency.

Management partition 52 and user partition 50 may then boot OS 62 and OS 60, respectively, as indicated at block 256. The process of FIG. 4 may then end.

FIG. 5 presents a flowchart of an example embodiment of a process that emulation agent 46 may use to support emulated legacy devices. The illustrated process may start after firmware 44 has launched emulation agent 46. Once emulation agent 46 has been launched, if it receives outbound I/O data from user partition 50 for an emulated legacy device, it translates that I/O data into a format suitable for transmission to the corresponding USB device (e.g., USB mouse 35), and then forward's the translated I/O data to the physical device, as indicated at blocks 312 and 314.

Also, as indicated at block 320 and 322, emulation agent 46 may periodically poll the physical device. When emulation agent 46 receives inbound I/O data from the physical device for user partition 50, emulation agent 46 translates the received data into a format suitable for transmission via a legacy interface, and forwards the translated data to user partition 50 via an emulated legacy interface (e.g., using interrupts and such), as shown at block 332.

Emulation agent 46 may then repeat operations such as those described above, as indicated by the arrows returning to block 312 from blocks 320, 330, and 332.

Processing system 20 may use any suitable mechanism to allow user partition 50 and management partition 52 to communicate with each other. For example, is processing system 20 uses firmware-based partitioning, an inter-partition bridge may be used to pass data between partitions. Alternatively, when user partition 50 resides in a virtual machine, the underlying VMM may be used to pass data between partitions.

Also, if a polled device is hot plugged into processing system 20, management partition 52 may initiate any necessary polling. In addition, upon detection of a new device (e.g., a USB mouse), emulation agent 46 can create an associated linkage between a particular non-polled port (e.g. serial COM1) with the newly plugged in USB device. This new linkage may be created in a seamless fashion, with no unusual cooperation required from OS 60 or from a person using processing system 20.

As has been described, in the example embodiment, firmware 44 presents an emulated legacy device to user partition 50 in place of a physical USB device. Consequently, user partition 50 need not perform polling. User partition 50 may therefore be able to keep processing unit 21 in a lower power or performance state than would be possible if polling were required. For instance, in one embodiment, emulation agent 46 allows user partition 50 to keep processing unit 21 in a reduced power state, such as C1, C2, or C3, while management partition 52 takes care of polling USB mouse 35. In another embodiment, emulation agent 46 may allow user partition 50 to keep processing unit 21 in a reduced performance state, such as P1, P2, etc., while management partition 52 takes care of polling USB mouse 35. In other embodiments, the user partition may use similar reduced power or performance states while the management partition takes care of polling peripheral devices. Various embodiments of processing systems may therefore enjoy increased energy efficiency.

In light of the principles and example embodiments described and illustrated herein, it will be recognized that the described embodiments can be modified in arrangement and detail without departing from such principles. For instance, although a single USB mouse is illustrated in one example embodiment, alternative embodiments include processing systems with user partitions that communicate with more than one USB device. The present invention also is not limited to USB devices, but may be used to support communications with other types of devices that require polling.

Also, even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media containing instructions for performing the operations of the invention. Such embodiments may also be referred to as program products. Such machine-accessible media may include, without limitation, storage media such as floppy disks, hard disks, CD-ROMs, ROM, and RAM, and other tangible arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality such as that described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method, comprising:

using polling to communicate with a device from a first partition of a processing system;

providing, via the first partition, an interface that allows a second partition of the processing system to communicate with the device without requiring the second partition to use polling, wherein communication between the second partition and the device is allowed only via the interface;

decreasing a power state of a processing unit associated with the second partition; and after decreasing the power state of the processing unit, using polling to communicate with the device from the first partition without substantially increasing the power state of the processing unit associated with the second partition.

2. A method according to claim 1, wherein the operation of providing an interface that allows a second partition of the processing system to communicate with the device without requiring the second partition to use polling comprises:
presenting the device to the second partition as an interrupt-driven device.

3. A method according to claim 1, further comprising:
decreasing the power state of a processing unit associated with the second partition;
after decreasing the power state of the processing unit, using polling to communicate with the device from the first partition without substantially increasing the power state of the processing unit associated with the second partition;
detecting, at the first partition, data from the device, wherein the data is destined for the second partition; and
increasing the power state of the processing unit associated with the second partition after the data destined for the second partition has been detected.

4. A method according to claim 3, further comprising:
after detecting the data from the device at the first partition, forwarding the data to the second partition.

5. A method according to claim 1, wherein:
the device comprises a peripheral device that communicates with the processing system via a universal serial bus (USB).

6. A method according to claim 1, wherein:
the device comprises a peripheral device that communicates with the processing system via a universal serial bus (USB); and
the operation of providing an interface that allows a second partition of the processing system to communicate with the device without requiring the second partition to use polling comprises:
providing the second partition with an interrupt-driven interface to the peripheral device.

7. A method according to claim 1, wherein the second partition comprises a guest virtual machine.

8. A method according to claim 1, wherein:
the first partition comprises a sequestered partition of the processing system; and
the second partition comprises a main partition of the processing system.

9. An apparatus, comprising:
a polling module to execute in a first partition of a processing system, the polling module to use polling to communicate with a device in communication with the processing system; and
a conversion module to execute in the first partition of the processing system, the conversion module to receive data associated with the device from the polling module, to convert the data to a non-polled protocol, and to forward the converted data to a second partition of the processing system, wherein communication between the second partition and the device is allowed only via the non-polled protocol, wherein after a power state of the processing unit is decreased, the polling module uses polling to communicate with the device from the first partition without substantially increasing the power state of the processing unit associated with the second partition.

10. An apparatus according to claim 9, further comprising:
an operating system in the second partition, the operating system to use only the non-polled protocol to communicate with the device.

11. An apparatus according to claim 9, further comprising:
the second partition to communicate with the device only via the conversion module in the first partition.

12. An apparatus according to claim 9, wherein:
the first partition comprises a service partition to handle device polling; and
the second partition comprises a user partition to execute user applications.

13. An apparatus according to claim 9, wherein:
the second partition comprises a guest virtual machine.

14. An apparatus according to claim 9, wherein:
the device comprises a universal serial bus (USB) peripheral device; and
the polling module and conversion module allow the second partition to communicate with the USB peripheral device substantially as if the USB peripheral device were an interrupt-driven device.

15. A manufacture, comprising:
a machine-accessible medium; and
instructions in the machine-accessible medium, wherein the instructions, when executed in a processing system, cause the processing system to perform operations comprising:
using polling to communicate with a device from a first partition of the processing system;
providing, via the first partition, an interface that allows a second partition of the processing system to communicate with the device without polling, wherein communication between the second partition and the device is allowed only via the interface;
maintaining a connection with the device after a power state of a processing unit associated with the second partition is decreased without substantially increasing the power state of the processing unit associated with the second partition.

16. A manufacture according to claim 15, wherein the instructions cause the processing system to present the device to the second partition as an interrupt-driven device.

17. A manufacture according to claim 15, wherein:
the instructions allow the second partition to use a universal serial bus (USB) device without polling.

18. A manufacture according to claim 15, wherein:
the instructions allow the second partition to use a universal serial bus (USB) device without polling; and
the instructions cause the first partition to provide the second partition with an interrupt-driven interface to the USB device.

19. A manufacture according to claim 15, wherein:
the second partition comprises a guest virtual machine; and
the instructions allow the guest virtual machine to use a universal serial bus (USB) device without polling.

* * * * *